(12) United States Patent
Line et al.

(10) Patent No.: US 10,427,567 B2
(45) Date of Patent: Oct. 1, 2019

(54) AIR CHANNEL FOAM PAD WITH THERMALLY CONDUCTIVE TAPE

(71) Applicant: Ford Global Technologies, LLC, Dearborn, MI (US)

(72) Inventors: Johnathan Andrew Line, Northville, MI (US); Spencer Robert Hoernke, Dundas (CA); Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/890,655

(22) Filed: Feb. 7, 2018

(65) Prior Publication Data

US 2019/0241101 A1    Aug. 8, 2019

(51) Int. Cl.
*B60N 2/56*    (2006.01)

(52) U.S. Cl.
CPC ......... *B60N 2/5642* (2013.01); *B60N 2/5685* (2013.01)

(58) Field of Classification Search
CPC ...... B60N 2/5642; B60N 2/5685; B60N 2/56; B60N 2/5621; B60N 2/5628; B60N 2/5635; B60N 2/565; B60N 2/5657; B60N 2/5678; B60N 2/5692; B60N 2/5614
USPC .................................................. 297/180.12
See application file for complete search history.

(56) References Cited

U.S. PATENT DOCUMENTS

| | | |
|---|---|---|
| 5,597,200 A | 1/1997 | Gregory et al. |
| 5,626,021 A | 5/1997 | Karunasiri et al. |
| 6,079,485 A | 6/2000 | Esaki et al. |
| 6,119,463 A | 9/2000 | Bell |
| 6,291,803 B1 | 9/2001 | Fourrey |
| 6,541,737 B1 * | 4/2003 | Eksin ................. B60H 1/00792 219/217 |
| 7,178,344 B2 | 2/2007 | Bell |
| 7,320,357 B2 | 1/2008 | Pause |
| 7,475,464 B2 | 1/2009 | Lofy et al. |

(Continued)

FOREIGN PATENT DOCUMENTS

| | | |
|---|---|---|
| CN | 201890168 U | 7/2011 |
| CN | 203651539 U | 6/2014 |
| DE | 102013021199 A1 | 7/2014 |

OTHER PUBLICATIONS

Elarusi, Abdulmunaem H., "Optimal Design of a Thermoelectric Cooling/Heating System for Car Seat Climate Control (CSCC)" 2016. Master's Theses. 720, Western Michigan University, ScholarWorks at WMU.

(Continued)

*Primary Examiner* — Mark R Wendell
(74) *Attorney, Agent, or Firm* — Vichit Chea; Price Heneveld LLP

(57) ABSTRACT

A vehicle seat cushion assembly includes a first foam pad defining a ventilating column disposed therethrough, a topper pad disposed over the first foam pad, and a second foam pad disposed adjacent the first foam pad. The second foam pad and the first foam pad define a flow channel in fluid communication with the ventilating column. A thermally conductive tape includes a thermoelectric device disposed between the first foam pad and the topper pad. The thermoelectric device is disposed near an end of the ventilating column. An air mover moves air from an air intake of the flow channel to an air exhaust of the flow channel.

20 Claims, 12 Drawing Sheets

(56) References Cited

U.S. PATENT DOCUMENTS

| | | | |
|---|---|---|---|
| 7,480,950 B2 * | 1/2009 | Feher | A47C 7/74 |
| | | | 5/423 |
| 7,640,754 B2 | 1/2010 | Wolas | |
| 7,966,835 B2 | 6/2011 | Petrovski | |
| 8,359,871 B2 | 1/2013 | Woods et al. | |
| 8,702,164 B2 | 4/2014 | Lazanja et al. | |
| 9,105,808 B2 | 8/2015 | Petrovski | |
| 9,105,809 B2 | 8/2015 | Lofy | |
| 9,272,647 B2 | 3/2016 | Gawade et al. | |
| 9,310,112 B2 | 4/2016 | Bell et al. | |
| 9,335,073 B2 | 5/2016 | Lofy | |
| 9,366,461 B2 | 6/2016 | Bell et al. | |
| 9,403,460 B2 * | 8/2016 | Hickey | B60N 2/565 |
| 9,440,567 B2 | 9/2016 | Lazanja et al. | |
| 9,676,310 B2 | 6/2017 | Fitzpatrick et al. | |
| 2004/0139758 A1 * | 7/2004 | Kamiya | B60N 2/5635 |
| | | | 62/244 |
| 2006/0087160 A1 | 4/2006 | Dong et al. | |
| 2006/0175877 A1 * | 8/2006 | Alionte | A47C 7/74 |
| | | | 297/180.14 |
| 2006/0208540 A1 | 9/2006 | Lofy et al. | |
| 2007/0158981 A1 * | 7/2007 | Almasi | A47C 7/74 |
| | | | 297/180.12 |
| 2007/0176471 A1 * | 8/2007 | Knoll | B60N 2/5635 |
| | | | 297/180.14 |
| 2009/0033130 A1 | 2/2009 | Marquette et al. | |
| 2010/0327637 A1 | 12/2010 | Bajic et al. | |
| 2011/0226751 A1 * | 9/2011 | Lazanja | B60N 2/5685 |
| | | | 219/217 |
| 2012/0080911 A1 | 4/2012 | Brykalski et al. | |
| 2013/0097777 A1 | 4/2013 | Marquette et al. | |
| 2014/0041396 A1 * | 2/2014 | Makansi | F25B 21/04 |
| | | | 62/3.2 |
| 2015/0061331 A1 * | 3/2015 | Yang | A47C 7/744 |
| | | | 297/180.14 |
| 2015/0069798 A1 | 3/2015 | Bajic et al. | |
| 2015/0266405 A1 | 9/2015 | Fitzpatrick et al. | |
| 2015/0329027 A1 * | 11/2015 | Axakov | B60N 2/565 |
| | | | 297/180.13 |
| 2016/0009206 A1 | 1/2016 | Perraut et al. | |
| 2016/0128487 A1 * | 5/2016 | Eskridge, III | A47C 21/048 |
| | | | 5/423 |
| 2017/0164757 A1 * | 6/2017 | Thomas | A47C 7/021 |

OTHER PUBLICATIONS

Lee, Dr. Hosung, "Optimal Design of a Thermoelectric Cooling/Heating for Car Seat Comfort" 2014.

* cited by examiner

AIR CHANNEL FOAM PAD WITH THERMALLY CONDUCTIVE TAPE

FIELD OF THE DISCLOSURE

The present disclosure generally relates to a foam pad with a temperature control feature, and more particularly to a molded air channel foam pad with a thermally conductive tape.

BACKGROUND OF THE DISCLOSURE

Vehicle seat comfort has become increasingly important as occupants take longer trips. Economical seat designs allow for efficient manufacturing and incorporate cooling and heating features. However, improvements are always desired.

SUMMARY OF THE DISCLOSURE

According to one aspect of the present disclosure, a vehicle seat cushion assembly includes a first foam pad defining a ventilating column disclosed therethrough, a topper pad disposed over the first foam pad, and a second foam pad disposed adjacent the first foam pad. The second foam pad and the first foam pad define a flow channel in fluid communication with the ventilating column. A thermally conductive tape including a thermoelectric device is disposed between the first foam pad and the topper pad. The thermoelectric device is disposed near an end of the ventilating column. An air mover moves air from an air intake of the flow channel to an air exhaust of the flow channel.

Aspects of the first aspect of the disclosure can include any one or a combination of the following features:
- the thermally conductive tape further comprises a carrier and a support ring for retaining the thermoelectric device to the carrier;
- the support ring fits into a recessed periphery disposed about the ventilating column;
- a first surface of the support ring is substantially level with a first surface of the first foam pad;
- an interference fit between the support ring and the recessed periphery;
- an aperture in the topper pad and adjacent the thermoelectric device;
- a trim cover disposed over the topper pad;
- the air travels along a second surface of the thermoelectric device;
- the carrier retains a first thermoelectric device and a second thermoelectric device and wherein the carrier comprises a notched portion between the first thermoelectric device and the second thermoelectric device;
- the thermoelectric device is selectively activable to heat or cool a surface of the seat cushion in response to a temperature input from a sensor; and
- the sensor comprises an infrared sensor mounted on an interior trim piece and wherein the temperature input comprises a facial temperature.

According to a second aspect of the present disclosure, a seating assembly includes a seat. The seat includes first and second foam pads, a gallery disposed between the first and second foam pads, a ventilating column disposed through the first and second foam pads, a thermoelectric device disposed in a housing in a recess in the ventilating column, and an air mover moving air through the gallery, and along a second surface of the thermoelectric device.

Aspects of the second aspect of the disclosure can include any one or a combination of the following features:
- the thermoelectric device disposed in a housing comprises a plurality of thermoelectric devices disposed in housings arranged along a flexible strip, wherein the ventilating column comprises a plurality of ventilating columns, and wherein the gallery comprises a plurality of galleries that deliver air to the plurality of ventilating columns;
- the first foam pad and the second foam pad are mechanically locked;
- a substantially airtight seal forms around the gallery when a force is disposed on the seat;
- a first portion of the gallery is molded into the first foam pad and a second portion of the gallery is molded into the second foam pad; and
- a seatback, wherein the seatback comprises a first foam pad and a second foam pad, wherein a gallery is disposed between the first foam pad and the second foam pad, wherein a ventilating column is disposed through the first foam pad and the second foam pad, wherein the gallery delivers air to the ventilating column, and wherein a thermoelectric device in a housing is press fit into a recess in the ventilating column, and an air mover moving air through the gallery, along a second surface of the thermoelectric device, and out of the ventilating column.

According to a third aspect of the present disclosure, a method of making a cushion assembly comprises the steps of forming a first foam pad, forming a plurality of ventilating air columns through the first foam pad, forming a second foam pad, and forming the plurality of ventilating air columns through the second foam pad. The method of making a cushion assembly further comprises the step of operably coupling the second foam pad with the first foam pad to define flow channels between the first foam pad and the second foam pad. The flow channels are in fluid communication with the ventilating air columns. The method of making a cushion assembly further comprises the steps of placing thermoelectric devices proximate a first surface of the first foam pad and at least a portion of the plurality of ventilating air columns and coupling an air mover to the flow channels to move air to the thermoelectric devices.

Aspects of the third aspect of the disclosure can include any one or a combination of the following features:
- disposing the thermoelectric devices in housing portions of a carrier strip; and
- placing the housing portions into recesses in the ventilating air columns.

These and other aspects, objects, and features of the present disclosure will be understood and appreciated by those skilled in the art upon studying the following specification, claims, and appended drawings.

DETAILED DESCRIPTION

Figure 1:
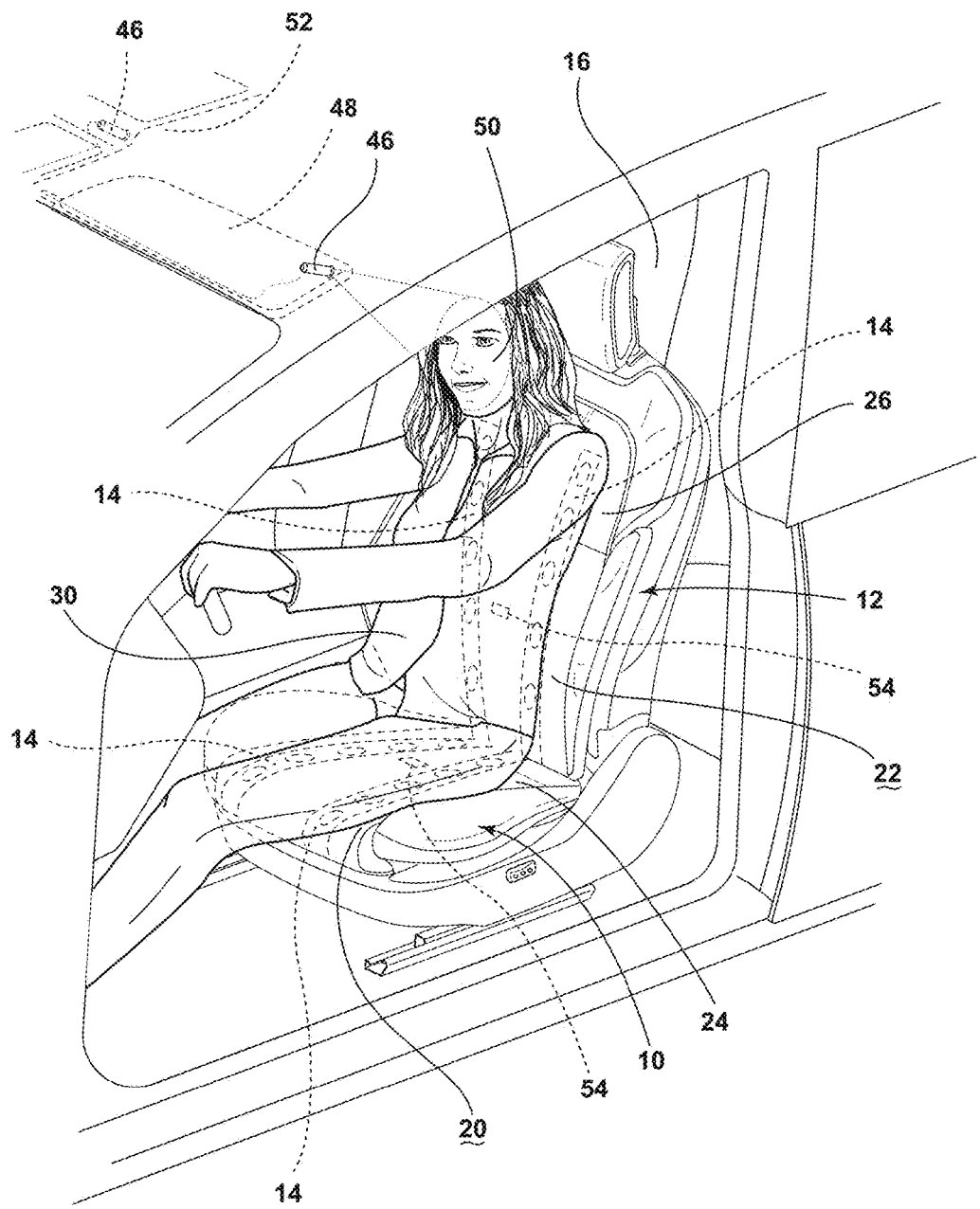
FIG. 1 is a side perspective view of a seating assembly in a vehicle of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As required, detailed aspects of the present disclosure are disclosed herein; however, it is to be understood that the disclosed aspects are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Traditional foam pads (typically expanded polypropylene (EPP)) used in cushion assemblies are difficult to cool and heat. As disclosed and illustrated within the various aspects of the device, placing a thermally conductive tape at the occupant facing surface of a traditional EPP pad cools and heats occupants and thus increases occupant comfort. The thermally conductive tape includes thermoelectric devices arranged along the length of the tape. Adding flow channels and ventilating columns to the EPP pad is desirable to deliver air to the thermoelectric devices to increase the efficiency of the thermoelectric devices and to avoid overheating of the thermoelectric devices. However, providing flow channels and ventilating columns in a traditional one piece EPP pad can result in failures of cushion assemblies. These failures typically result from point loading or abuse loading that results in high tensile stresses that occur at the bottom of an EPP pad or a cushion assembly. As a result, an improved EPP pad construction that can better manage point loading or abuse loading would prove beneficial while delivering air flows to the thermoelectric devices. Two part EPP pads with flow channels and ventilating columns used in combination with a thermally conductive tape aid the cooling and heating of the cushion assemblies while still providing a supportive, inexpensive seating assembly.

With reference now to FIG. 1, the seat cushion assembly 10, the seatback cushion assembly 12, and the thermally conductive tapes 14 are shown inside the vehicle cabin 16. The thermally conductive tapes 14 are typically disposed at the seat surface 20 and the seatback surface 22 below the seat trim 24 and the seatback trim 26. The thermally conductive tapes 14 cool or heat the occupant 30. Referring to FIGS. 3-6, ventilating columns 40 are disposed within the seat cushion assembly 10 and the seatback cushion assembly 12 to deliver air to the thermally conductive tapes 14 to increase the efficiency of the cooling and the heating of the thermoelectric devices 90. Flow channels 42 connect the ventilating columns 40 and deliver air to the ventilating columns 40. An air mover 44 supplies air to the flow channels 42.

Referring again to FIG. 1, sensors monitor the temperature of the occupant 30 and adjust the temperature of the seat surface 20 and the seatback surface 22 in response to the temperature of the occupant. An infrared sensor 46 may be located in the visor 48 or other portion of the passenger cabin, and may be directed to measure the temperature of the face 50 of the occupant 30. Similarly, an infrared sensor 46 may be located in the headliner 52 and may also be directed to measure the temperature of the face 50 of the occupant 30 or another body part of the occupant 30. In various aspects, a sensor 54 that is in direct contact with the seat surface 20 or the seatback surface 22 may measure the temperature of the seat surface 20, the seatback surface 22, and/or the body of the occupant 30 and deliver it to a controller that will adjust the voltage supplied to the thermally conductive tape 14 in response to the temperature of the occupant 30. In various aspects, the voltage of the thermally conductive tape 14 may be adjusted in response to a manual input from an occupant, the interior vehicle temperature, or another input. The thermally conductive tape 14 may be activated manually, remotely, wirelessly, or in another manner.

Figure 2:
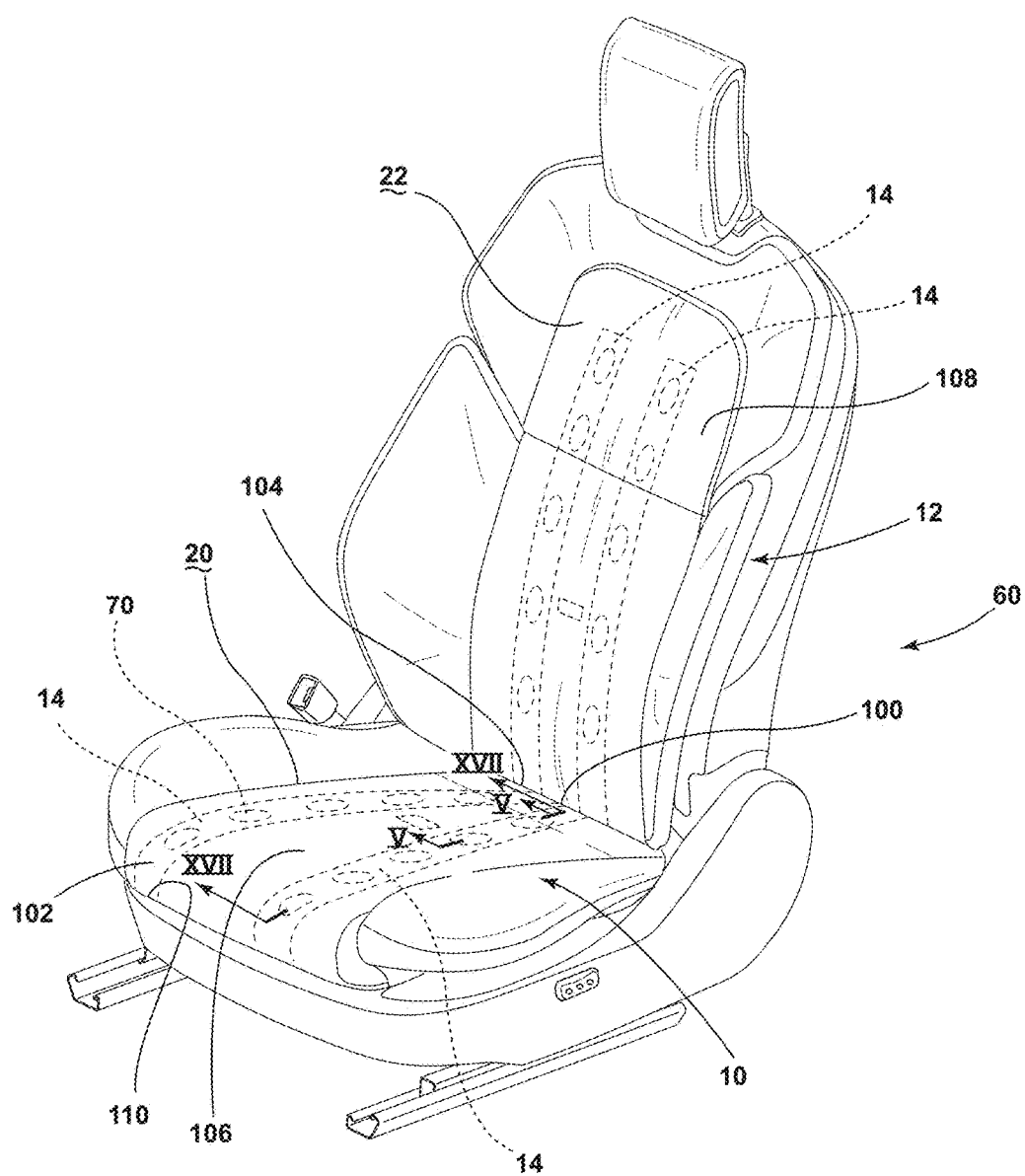
FIG. 2 is a side perspective view of the seating assembly of FIG. 1 of an aspect of the present disclosure.
Figure 3:
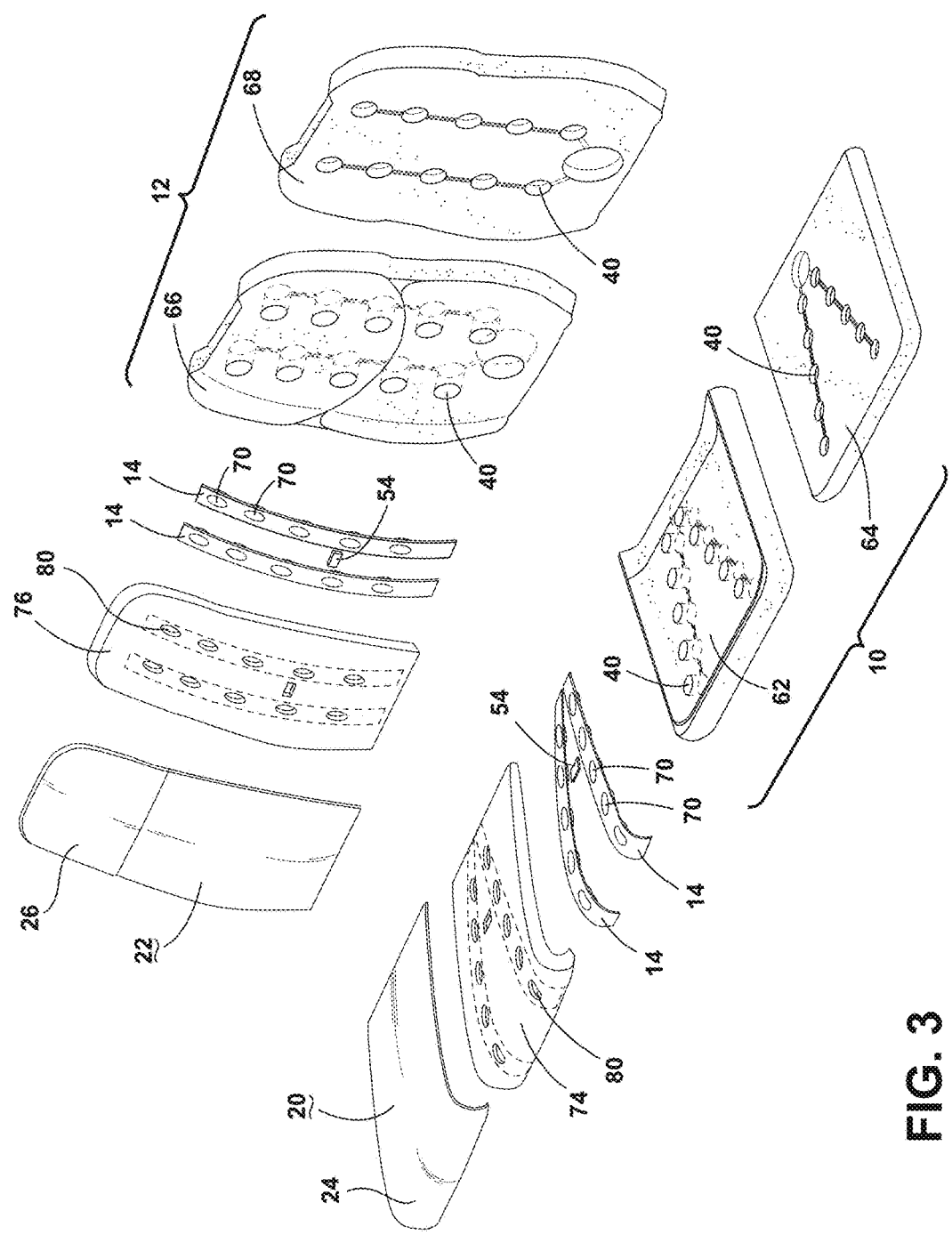
FIG. 3 is an exploded side perspective view of the seating assembly of FIG. 1 of an aspect of the present disclosure.
Figure 5:
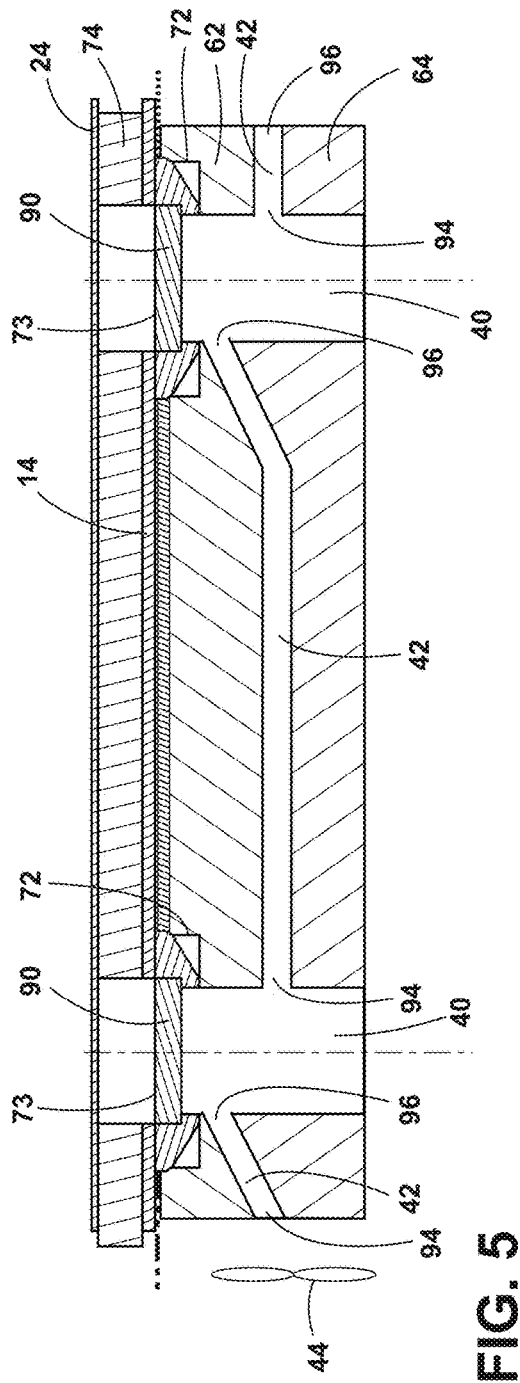
FIG. 5 is a cross sectional view of a portion of the seat of the seating assembly of FIG. 2 taken along line V-V of an aspect of the present disclosure.

Referring to FIGS. 2, 3, and 5, the seating assembly 60 includes a seat cushion assembly 10 and a seatback cushion assembly 12. The seat cushion assembly 10 includes a first foam pad 62 and a second foam pad 64. The seatback cushion assembly 12 includes a first or forward foam pad 66 and a second or rearward foam pad 68. Thermally conductive tapes 14 are disposed near the seat surface 20 and the seatback surface 22 near the ends 73 of ventilating columns 40.

With reference to FIGS. 4-6 and 9, the thermally conductive tapes 14 include thermoelectric device nodes 70 that are positioned at the recessed peripheries 72 of the ventilating columns 40. A thermoelectric device node 70 includes at least a thermoelectric device 90 disposed within the housing or support ring 120 and below the carrier 122. Referring again to FIG. 3, the thermally conductive tapes 14 are arranged below a seat topper pad 74 and a seatback topper pad 76. The seat topper pad 74 is covered by a seat trim 24. The seatback topper pad 76 is covered by a seatback trim 26. Apertures 80 in the seat topper pad 74 and the seatback topper pad 76 are located above the nodes 70. In certain aspects, there may be apertures 80 above thermoelectric devices 90 to allow for compressing of seat topper pad 74 and seatback topper pad 76 when an occupant is in the seating assembly 60. When the seat topper pad 74 and the seatback topper pad 76 are not fully compressed, the apertures 80 allow for transfer of heat within the apertures 80.

Referring again to FIG. 3, the first or upper foam pad 62 of the seat cushion assembly 10 is configured to provide support to the buttocks of an occupant, and is also configured to provide ventilation to the first foam pad 62 proximate the nodes 70. It will be understood that the first foam pad 62 may take on a variety of shapes and constructions, and that the illustrated construction is exemplary. As with the first foam pad 62, the second or lower foam pad 64 of the seat cushion assembly 10 may take on a variety of shapes and constructions and is not limited to the construction as set forth in FIG. 3.

The first or forward foam pad 66 of the seatback cushion assembly 12 is configured to provide support to the back and shoulders of an occupant, and is also configured to provide ventilation to the first foam pad 66. It will be understood that the first foam pad 66 of the seatback cushion assembly 12 may take on a variety of shapes and constructions, and that the illustrated construction is exemplary. As with the first foam pad 66 of the seatback cushion assembly 12, the second foam pad 68 of the seatback cushion assembly 12 may take on a variety of shapes and constructions and is not limited to the construction set forth in FIG. 3.

Referring to the aspect generally illustrated in FIGS. 1-18, a vehicle seat cushion assembly 10 includes a first foam pad 62 defining a ventilating column 40 disposed therethrough, a topper pad 74 disposed over the first foam pad 62, and a second foam pad 64 disposed adjacent the first foam pad 62. The second foam pad 64 and the first foam pad 62 define a flow channel 42 in fluid communication with the ventilating column 40. A thermally conductive tape 14 includes a thermoelectric device 90 disposed between the first foam pad 62 and the topper pad 74. The thermoelectric device 90 is disposed near an end of the ventilating column 40. An air mover 44 moves air from an air intake 94 of the flow channel 42 to an air exhaust 96 of the flow channel 42.

Referring now to FIGS. 2-8, the thermally conductive tapes 14 have a first end 100 and a second end 102. The first end 100 is at the juncture 104 between the seat 106 and the seatback 108. The second end 102 is at a seating surface edge 110. The conductive tape 14 includes conductive nodes 70 located along at least a part of the length of a carrier 122 to cool or heat a portion of the seat surface 20 and the seatback surface 22 to comfort the occupant 30. A node 70 may include a carrier portion 123 that is located proximate the thermoelectric device 90, the thermoelectric device 90, adhesives 124 for securing the housing or support ring 120 to the carrier portion 123, and the support ring 120. Thermoelectric devices 90 are disposed in the support rings 120. The support rings 120 are attached to the bottom of the carrier 122 with adhesives 124. The carrier 122 includes circular holes 126 above the thermoelectric devices 90. In various aspects, the carrier 122 may also include a conductive copper strip 128 located above the carrier 122 and thermally coupled to the thermoelectric devices 90. In various aspects, heat sinks 130 may be attached to the second surfaces 132 of the thermoelectric devices 90.

In various aspects, copper strip 128 may be a thin copper foil that may be from approximately 0.1 mm to approximately 0.3 mm thick. In various aspects, the foil may be approximately 0.25 mm thick. The copper strip 128 may be a variety of different shapes, and it may be laser cut from a strip of copper. In other aspects, the copper strip 128 may be made of brass, aluminum, conductive metals, or other thermally conductive materials.

In various aspects, the carrier 122 is extruded or otherwise formed. The holes 126 are punched into the carrier 122. In various aspects, the holes 126 are formed in the carrier 122 during the injection molding process. In yet other aspects, the carrier 122 may be injection molded without the holes 126, and the holes 126 may be punched into the carrier. In various aspects, the carrier 122 is an elastomeric plastic.

Figure 4:
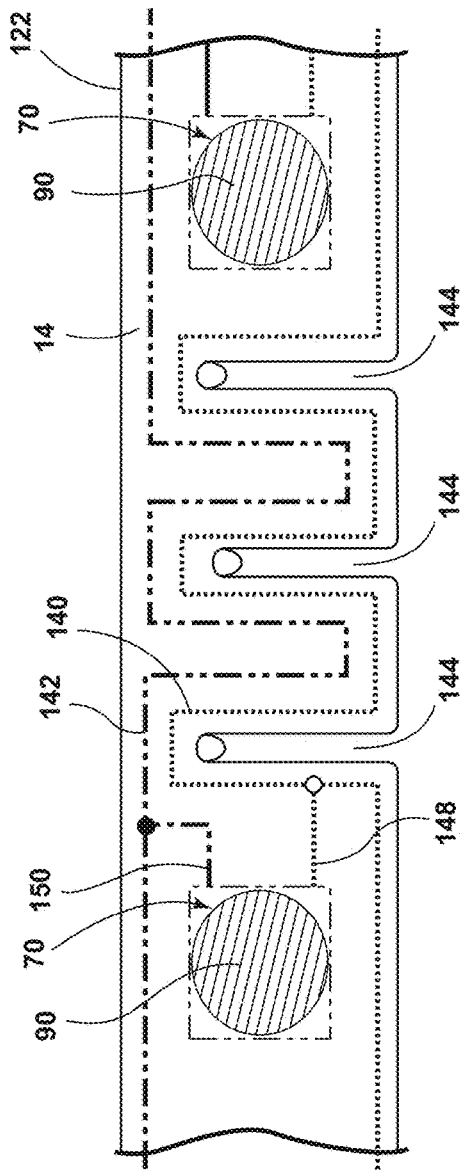
FIG. 4 is a top plan view of a portion of the thermally conductive tape shown on the seating assembly of FIG. 1 of an aspect of the present disclosure.
Figure 6:
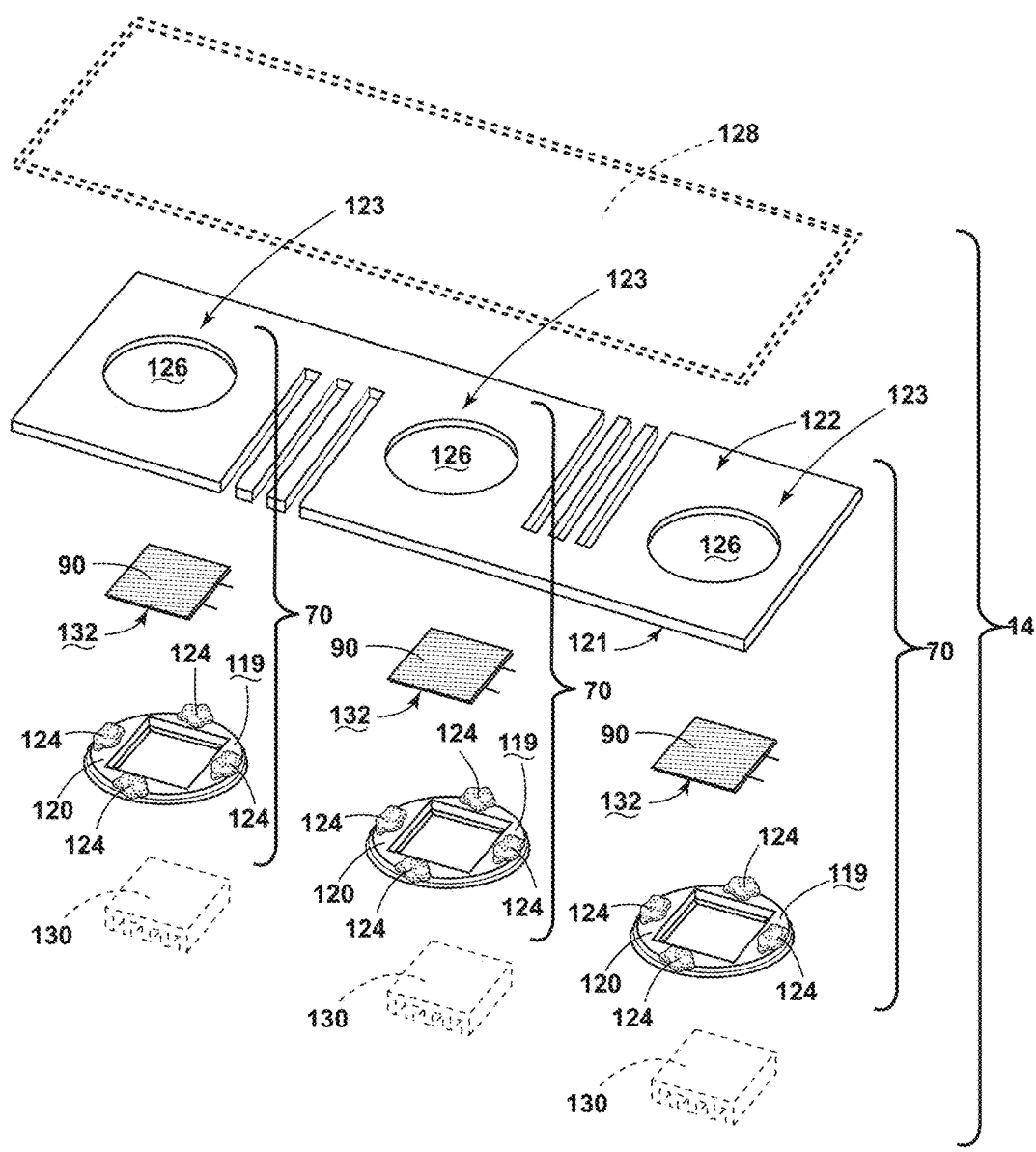
FIG. 6 is an exploded view of a portion of the thermally conductive tape shown on the seating assembly of FIG. 2 of an aspect of the present disclosure.

Referring to FIGS. 4-6, the thermoelectric devices 90 are attached to the positive wire 140 and the negative wire 142 that runs along at least a portion of the length of the carrier 122. The carrier 122 may have notches 144 between the nodes 70. The notches 144 typically provide flexibility to the carrier 122.

With reference to FIGS. 2-6, the thermally conductive tape 14 is typically powered from a vehicle wire harness at the juncture 104. Thermoelectric devices 90 have positive leads 148 and negative leads 150 that are typically soldered to the positive supply wire 140 and the negative supply wire 142, respectively. The positive and negative supply wires 140, 142 are adhesively attached to the underside 121 of the carrier 122.

Referring to FIGS. 4-8, the wire harness supplies power to the thermoelectric devices 90 through the positive and negative supply wires 140, 142 at various voltages. The voltage amount determines the temperature differential across the thermoelectric device first surface 160 and the thermoelectric device second surface 132. Current flow that is positive to negative from the first surface 160 of the thermoelectric device 90 to the second surface 132 of the thermoelectric device 90 cools the seating surface (all or a portion of seat surface 20 and/or seatback surface 22). Conversely, current flow that is negative to positive from the first surface 160 of the thermoelectric device 90 to the lower surface 132 of the thermoelectric device 90 heats the seating surface.

Figure 7:
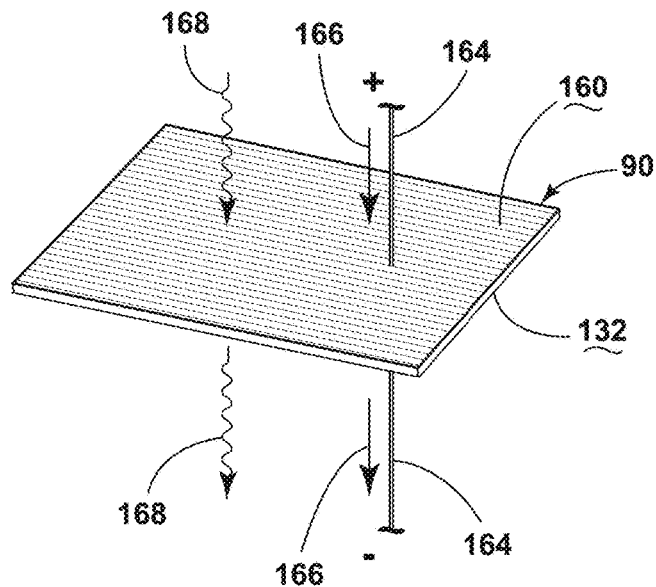
FIG. 7 is an electricity/heat schematic showing heat traveling from the upper surface of the thermoelectric device to the lower surface of the thermoelectric device of an aspect of the present disclosure.
Figure 8:
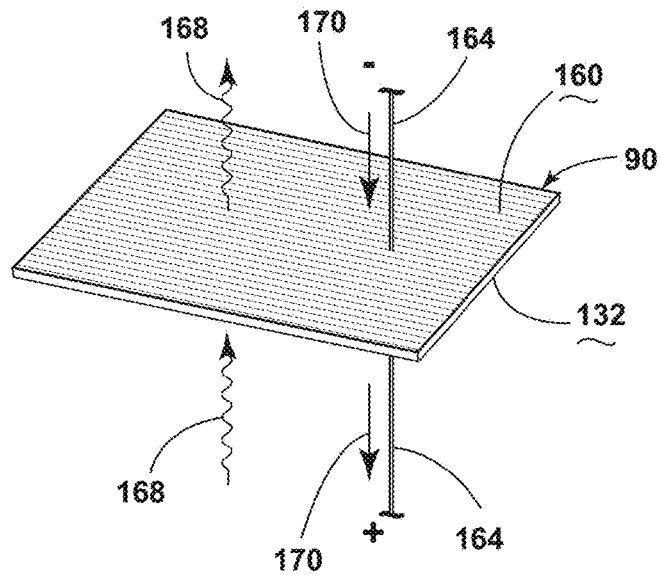
FIG. 8 is an electricity/heat schematic showing heat traveling from the lower surface of the thermoelectric device to the upper surface of the thermoelectric device of an aspect of the present disclosure.

Referring to FIGS. 7 and 8, schematics of current directions and heat flows of the thermoelectric device 90 in the occupant cooling and occupant heating modes are shown. As illustrated in FIG. 7, current 164 flows into and out of the thermoelectric device 90 in the depicted positive to negative direction. Arrows 166 depict the directional flow of current 164. Heat 168 flows from the cold thermoelectric device first surface 160 to the hot thermoelectric device second surface 132 thereby absorbing heat from the seating surface and, as a result, cools the seating surface. Referring to FIG. 8, current 164 flows into and out of the thermoelectric device 90 in the depicted negative to positive direction. Arrows 170 depict the directional flow of current 164. Heat 168 is absorbed from the cold thermoelectric device second surface 132 and heat 168 is simultaneously rejected by the first surface 160 to heat the seating surface.

Figure 10:
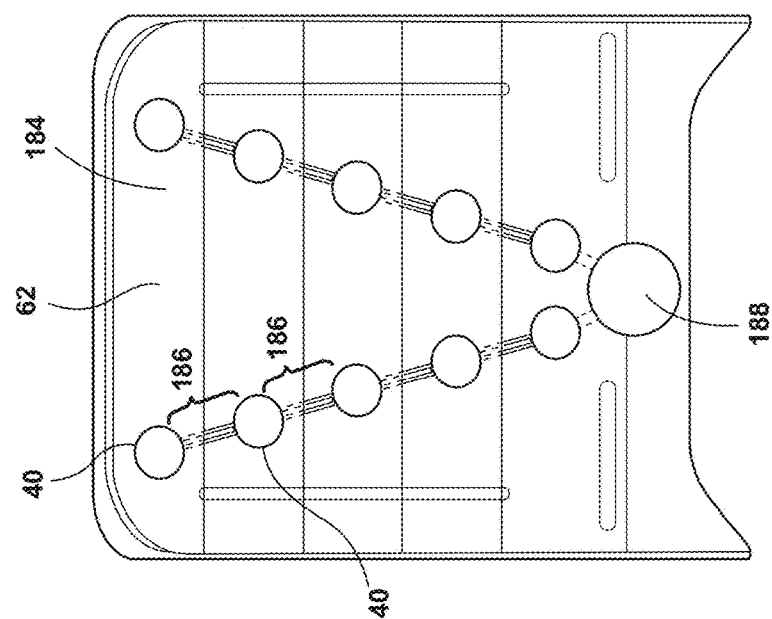
FIG. 10 is a bottom plan view of the upper foam pad of the seat cushion assembly of FIG. 9 with a plurality of ventilating columns and gallery portions, according to an aspect of the present disclosure.
Figure 9:
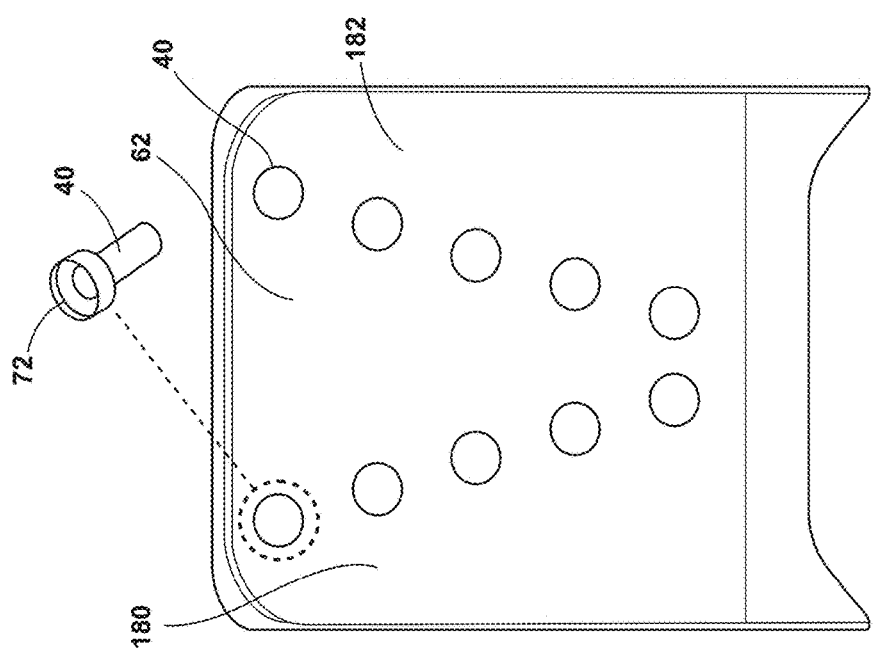
FIG. 9 is a top plan view of an upper foam pad of the seat cushion assembly of FIG. 3 with a plurality of venting columns according to an aspect of the present disclosure.

Referring now to FIGS. 9-10, the first foam pad 62 of the seat cushion assembly 10 is shown. FIG. 9 depicts a top portion 180 of the first foam pad 62. In the depicted aspect, ventilating columns 40 extend through the first foam pad 62. As shown in FIG. 9, the ventilating columns 40 include recessed peripheries 72 disposed around the ventilating columns 40 at the surface 182 of the occupant facing portion 180 of the first foam pad 62. A portion 184 of the first foam pad 62 includes ventilating columns 40 and gallery portions 186 that connect the ventilating columns 40. The gallery portions 186 receive air from an air supply area 188 located in the first foam pad 62. The air supply area 188 typically receives air from an air mover 44.

Figure 12:
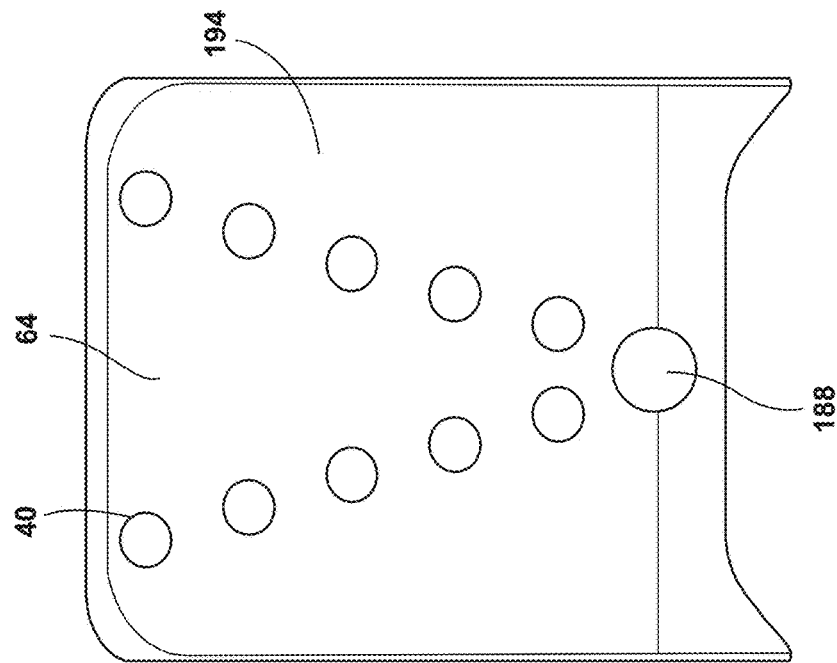
FIG. 12 is a bottom plan view of the lower foam pad of the seat cushion assembly of FIG. 11 with a plurality of ventilating columns and gallery portions, according to an aspect of the present disclosure.
Figure 11:
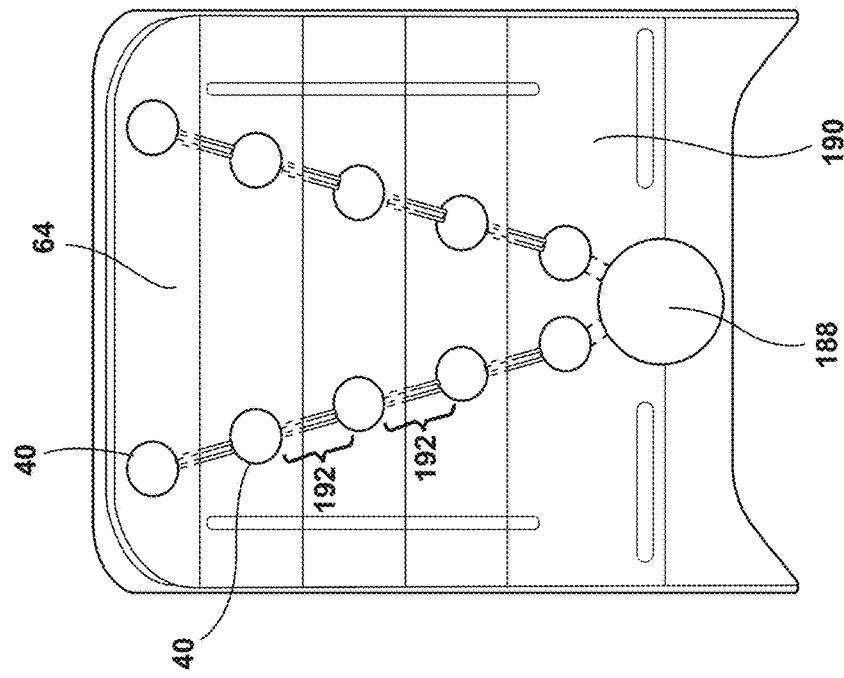
FIG. 11 is a top plan view of a lower foam pad of a seat of the seat cushion assembly of FIG. 3 with a plurality of ventilating columns and gallery portions, according to an aspect of the present disclosure.

With reference to FIGS. 11 and 12, the second foam pad 64 includes ventilating columns 40 configured to operably connect with ventilating columns 40 in the first foam pad 62. The second foam pad 64 includes a portion 190 that includes gallery portions 192. With reference to FIG. 12, a portion 194 of the second foam pad 64 includes ventilating columns 40. The air supply area 188 is shown on the portion 190 of the second foam pad 64 and the portion 194 of the second foam pad 64.

Referring to FIGS. 9-12, when the first foam pad 62 is operably coupled to the second foam pad 64, then the gallery portions 186 and 192 partially define flow channels 42 between the first foam pad 62 and the second foam pad 64. When the first foam pad 62 is operably coupled to the second foam pad 64, then ventilating columns 40 in the first foam pad 62 and ventilating columns 40 in the second foam pad 64 define columns 40 through the first foam pad 62 and the second foam pad 64.

Figure 14:
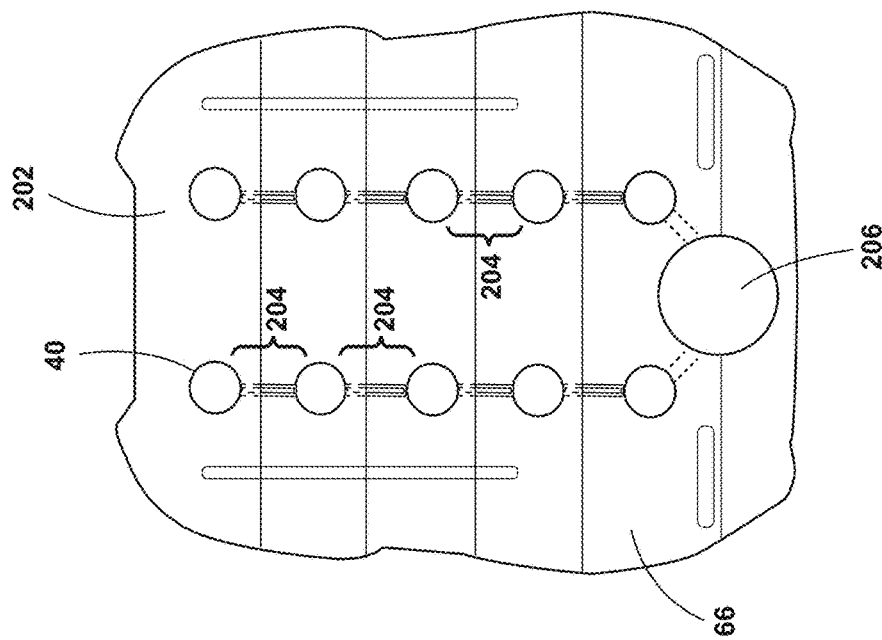
FIG. 14 is a rear elevational view of the front foam pad of the seatback cushion assembly of FIG. 13 with a plurality of ventilating columns and gallery portions, according to an aspect of the present disclosure.
Figure 13:
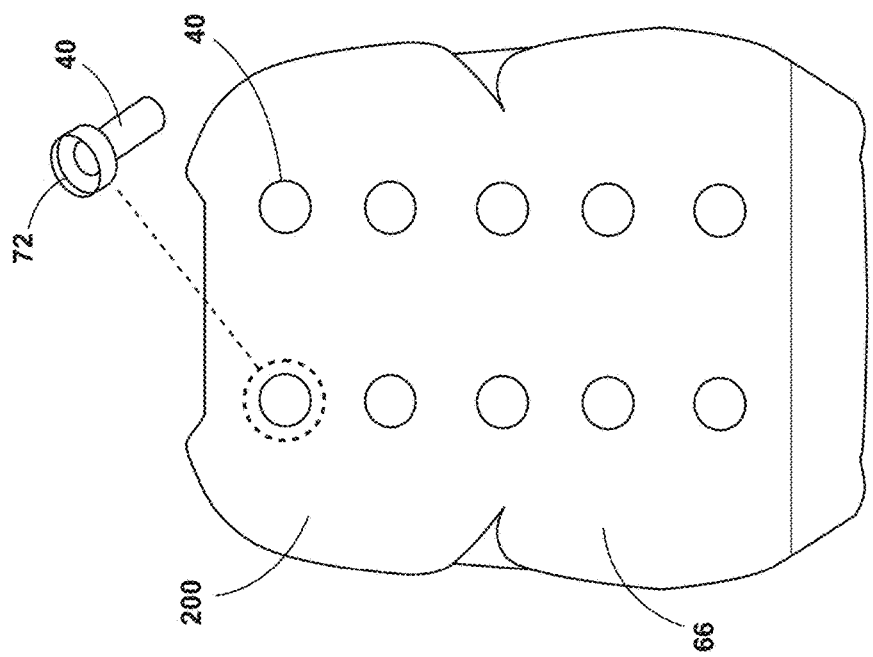
FIG. 13 is a front elevational view of a front foam pad of the seatback cushion assembly of FIG. 3 with a plurality of ventilating columns, according to an aspect of the present disclosure.

With reference to FIGS. 13 and 14, a first seatback foam pad 66 is shown. FIG. 13 shows a top portion 200 of the first seatback foam pad 66. The first seatback foam pad 66 includes ventilating columns 40 with recessed peripheries 72. Referring to FIG. 14, the occupant facing portion 202 of the first seatback foam pad 66 is shown. The back view shows the portion 202 of the first seatback foam pad 66 with ventilating columns 40 that are connected by gallery portions 204. The gallery portions 204 receive air from an air supply area 206 located in the first seatback foam pad 66. The air supply area 206 typically receives air from an air mover 44.

Figure 16:
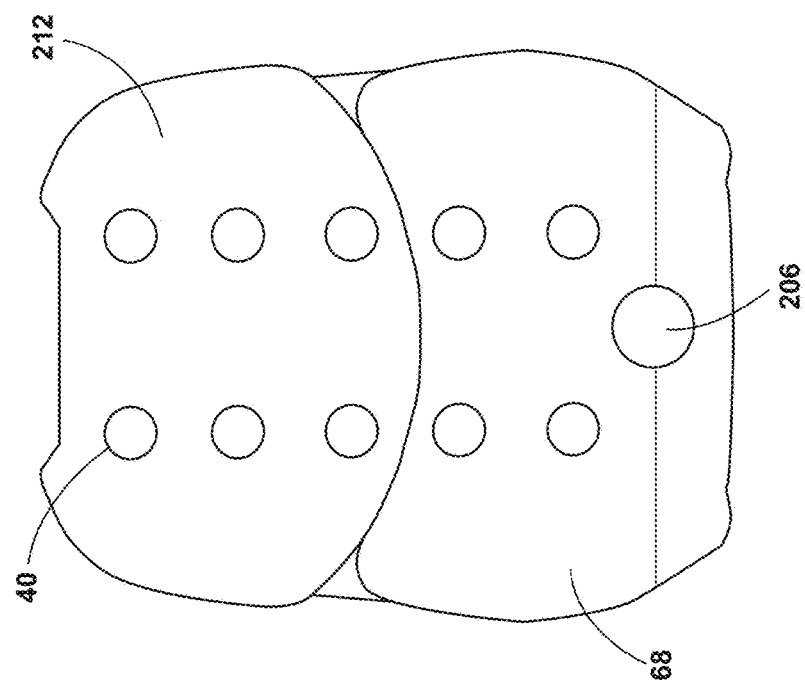
FIG. 16 is a rear elevational view of the rear foam pad of the seatback cushion assembly of FIG. 15 with ventilating columns according to an aspect of the present disclosure.
Figure 15:
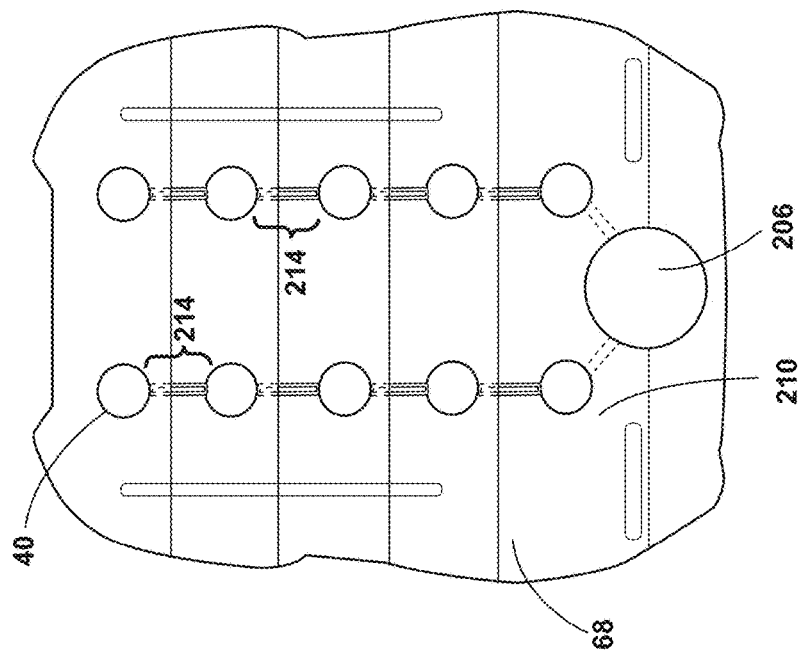
FIG. 15 is a front elevational view of a rear foam pad of a seatback cushion assembly of FIG. 3 with ventilating columns and gallery portions according to an aspect of the present disclosure.

Referring to FIG. 15, a portion 210 of the second seatback foam pad 68 is shown. Ventilating columns 40 protrude through the second foam pad 68. Gallery portions 214 connect the ventilating columns 40. The gallery portions 214 are connected to the air supply area 206. Referring to FIG. 16, a portion 212 of second seatback foam pad 68 is shown. Ventilating columns 40 and air supply area 206 are shown on the portion 212.

Referring to FIGS. 13-16, when the first seatback foam pad 66 is operably coupled to the second foam pad 68, then the gallery portions 204 and 214 and the ventilating columns 40 partially define flow channels between the first seatback foam pad 66 and the second foam pad 68. When the first seatback foam pad 66 is operably coupled to the second seatback foam pad 68, then the ventilating columns 40 in the first foam pad 66 and the ventilating columns 40 in the second foam pad 68 define columns 40 through the first foam pad 66 and the second foam pad 68.

Figure 17:
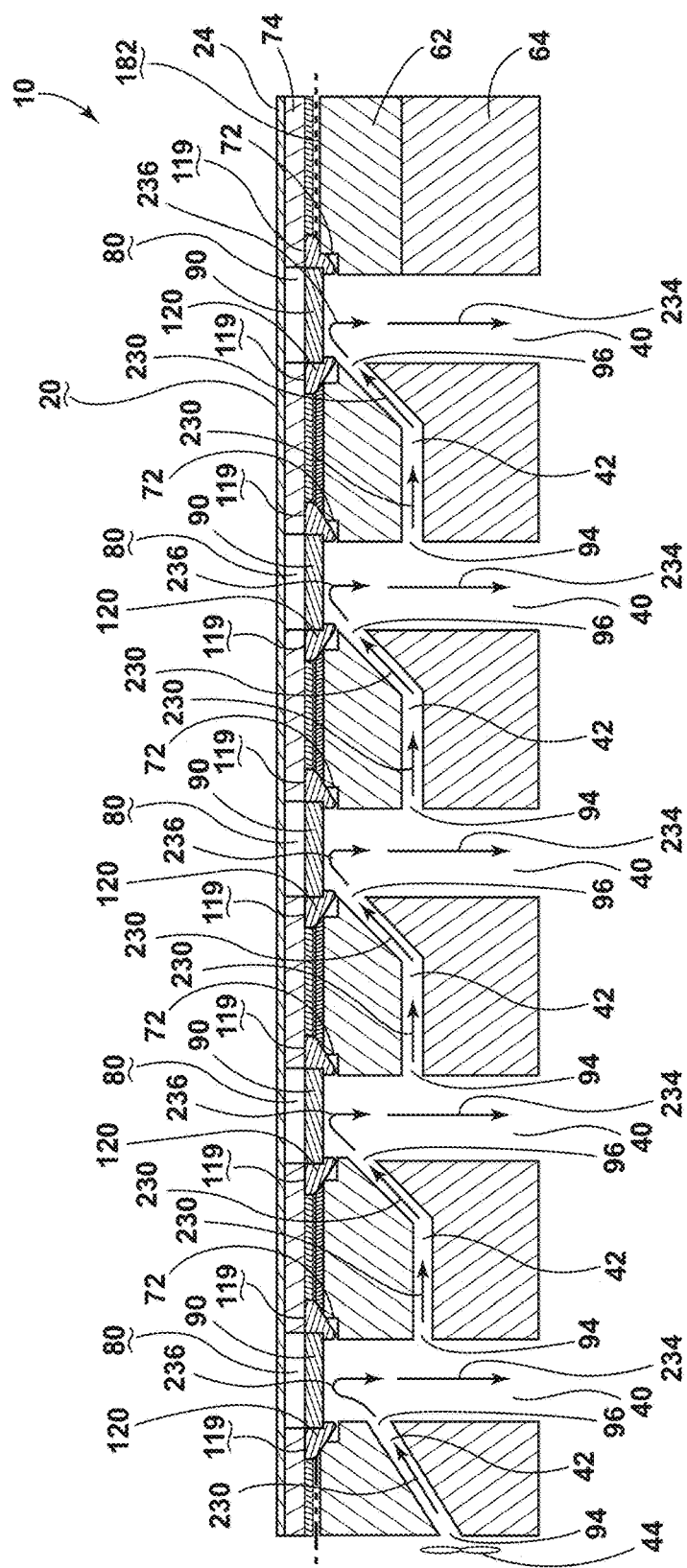
FIG. 17 is a cross sectional view of a portion of the seat of the seating assembly of FIG. 2 taken along line XVII-XVII of an aspect of the present disclosure.

Referring to FIG. 17, a cross sectional view of the seat cushion assembly 10 taken at cross sectional XVII-XVII of FIG. 2 is shown. Air mover 44 directs air depicted by arrows 230 through flow channels 42 and air depicted by arrows 236 and 234 through ventilating columns 40. The seat cushion assembly 10 is made of a first foam pad 62 and a second foam pad 64. The gallery portions 186 in the first foam pad 62 and the gallery portions 192 in the second foam pad 64 define galleries or flow channels 42 when the first foam pad 62 and the second foam pad 64 are coupled together. In the depicted aspect, the flow channels 42 are diagonal proximate the second surface 132 of the thermoelectric device 90 to deliver air to the second surface 132 to assist in heat transfer. The thermally conductive tape 14 is arranged above and within the ventilating columns 40 and recessed peripheries 72. Support rings 120 snap fit into the recessed peripheries 72 of the ventilating columns 40. Topper pad 74 is disposed over the first or upper foam pad 62 and the thermally conductive tape 14. Trim 24 is disposed over the topper pad 74. Apertures 80 in the topper pad 74 are above the thermoelectric device nodes 70.

Referring to FIGS. 7 and 17, when the current direction of the thermoelectric devices 90 is set to cool the occupant, heat 168 is drawn away from the seat surface 20 by the cold first surface 160 of the thermoelectric device 90. Heat travels through the trim 24 to the cold first surface 160 of the thermoelectric device 90. The hot second surface 132 of the thermoelectric device 90 then transfers heat to the air flow shown by arrow 236 that carries the heat away from the thermoelectric device 90. Referring to FIGS. 8 and 17, when the thermoelectric devices 90 are activated to heat the occupant, heat 168 moves from the air beneath the thermoelectric device 90 to the cold second surface 132 of the thermoelectric device 90 and to the hot first surface 160 of the thermoelectric device 90. During this heat transfer, air flows shown by arrow 236 carry air along the second surface 132 of the thermoelectric device 90. When the thermoelectric devices 90 are activated to heat the occupant, thermoelectric device 90 takes the low energy in air flows shown by arrow 236 and increases the energy to make air above the thermoelectric devices 90 warmer than air below the thermoelectric devices 90. Airflows depicted by arrows 230 through flow channels 42 and airflows depicted by arrows 236 and 234 through ventilating columns 40 assist with the heat transfer.

When the first foam pad 62 and the second foam pad 64 of the seat cushion assembly 10 are coupled together, they are typically mechanically locked. In various aspects, a substantially air tight seal typically forms between the first foam pad 62 and the second foam pad 64 around the flow channel 42 and ventilating column 40 interface when a force (e.g., weight of a seated occupant) is disposed on the seat cushion assembly 10. A gallery portion 186 on the portion 184 of the first foam pad 62 and a gallery portion 192 on the portion 190 of the second foam pad 64 define flow channels or galleries 42 when the first foam pad 62 and the second foam pad 64 are operationally coupled.

In various aspects, a first surface 119 of the support ring 120 is substantially level with a first surface 182 of the first foam pad 62.

Figure 18:
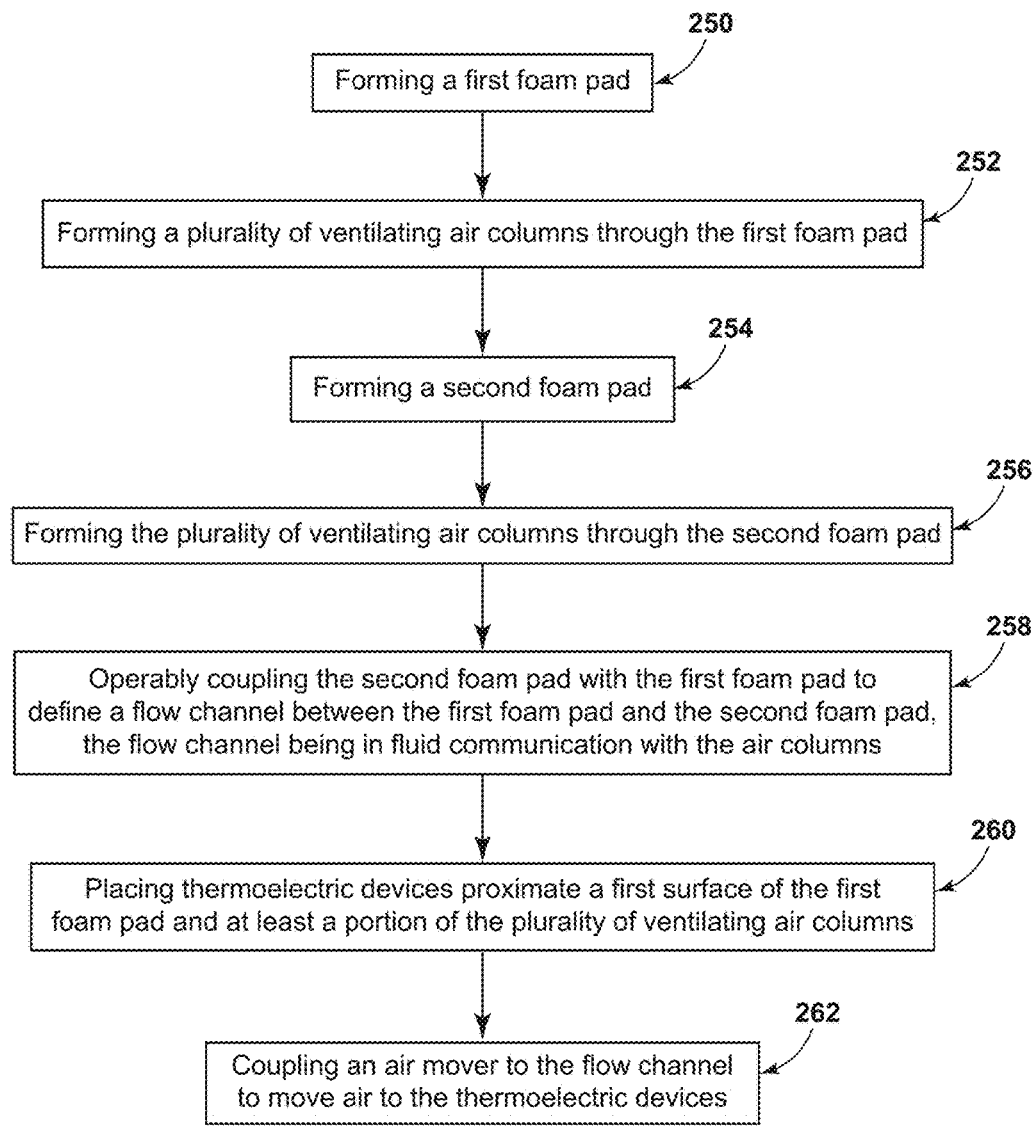
FIG. 18 is a flow diagram of a method for making a cushion assembly according to an aspect of the present disclosure.

FIG. 18 depicts a flow chart of the method of making a cushion assembly 10. Having described a cushion assembly 10 in FIGS. 1-17 herein, a method is now described for making a cushion assembly 10. Step 250 provides for forming a first foam pad 62. Step 252 provides for forming a plurality of ventilating air columns 40 through the first foam pad 62. Step 254 provides for forming a second foam pad 64. Step 256 provides for forming the plurality of ventilating air columns 40 through the second foam pad 64. Step 258 directs operably coupling the second foam pad 64 with the first foam pad 62 to define a flow channel 42 between the first foam pad 62 and the second foam pad 64, the flow channel 42 being in fluid communication with the air columns 40. Step 260 directs placing thermoelectric devices 90 proximate a first surface 182 of the first foam pad 62 and at least a portion of the plurality of ventilating air columns 40. Step 262 provides for coupling an air mover 44 to the flow channel 42 to move air to the thermoelectric devices 90.

The size, shape, and location of the thermoelectric device nodes 70 and the ventilating columns 40 may be modified to provide for targeted occupant cooling and heating.

In various aspects, the thermally conductive tapes 14 and the ventilating columns 40 may be placed on the vehicle seating assembly 60 where the human body has its greatest cooling and heating sensitivity. The sensitivity might be where the main arteries of the legs and the largest muscle groups of the legs are located and where the main arteries of the back and the largest muscle groups of the back are located.

In various aspects, the thermally conductive tapes 14 cool or heat the occupant by conduction directly through the seat trim 24 and the seatback trim 26. In various aspects, the thermally conductive tapes 14 and ventilating columns 40 are effective in the typical human comfort range between 20-37 degrees Celsius. In various aspects, the thermoelectric device 90 first surface 160 and second surface 132 may be made of ceramics or other materials.

In various aspects, the thermoelectric devices 90 in thermally conductive tapes 14 and the airflows shown by arrows 230, 236, 234 work in unison to cool or heat the occupant. In various aspects, only the seat cushion assembly 10 thermally conductive tapes 14 or only the seatback cushion assembly 12 thermally conductive tapes 14 may be activated.

It is to be understood that use of the seat cushion assembly 10 airflows shown by arrows 230, 236, 234 and the seatback cushion assembly 12 airflows shown by arrows 230, 236, 234 in various aspects may be modified to enhance the cooling or heating of the occupant.

In various aspects, an elongated recess may be molded into the first seat foam pad 62 or the first seatback foam pad 66 to receive the thermally conductive tape 14.

A variety of advantages may be derived from the use of the present disclosure. An occupant is able to control the cooling or heating of the seat cushion assembly 10 and the seatback cushion assembly 12. An economical, easily moldable seat cushion assembly and seatback cushion assembly provide flow channels and ventilating columns that aid the efficiency of the thermoelectric devices 90. The thermally conductive tapes 14 may be lay-in-place devices. The thermally conductive tapes 14 may be modular. The thermally conductive tape 14 may be cut to a desired length.

The flow channels are internal channels in EPP foam for air flow to get to the ventilating columns and thermoelectric devices to accelerate cooling of the seating surface through the use of conduction. The air flow channels in the EPP foam also allow air flow to get to the ventilating columns and thermoelectric devices to assist in heating the seat surface through the use of conduction. By sandwiching together a top cushion and a bottom cushion in the case of a seat cushion assembly or, alternatively, a front cushion and a rear cushion in the case of a seatback cushion assembly, a complex internal geometry may be created with simple molds. By sandwiching together a top cushion and a bottom cushion to form a seat cushion assembly, a solid bottom structure that prevents high tensile stresses from occurring at weak points minimizes the chance of failure during loading. The use of thermoelectric device technology promotes better heat transfer from the occupant to air flowing beneath the thermoelectric devices in the flow channels and ventilating columns to improve the occupant thermocomfort. The thermally conductive tapes, flow channels, and ventilating columns are capable of working in both occupant cooling and occupant heating applications. Flow channels and ventilating columns enable the design of foam pad arrangements with thermoelectric devices which can cool specific hot points on an occupant instead of cooling an entire surface, thus maximizing the efficiency of the cooling system. Similarly, the flow channels and ventilating columns enable the design of heating systems which can heat specific cool points on an occupant instead of heating an entire surface which maximizes the efficiency of the heating system. A cushion assembly including the flow channels, ventilating columns, and thermally conductive tapes provides for localized cooling and heating to targeted portions of the cushion assembly and/or the occupant's body. EPP foam allows for fans and wiring to be easily installed by directly press fitting to the EPP foam, thus making installation and packaging easier. EPP foam noise insulating qualities allow for the possibility of a more powerful air mover being used without effecting the user experience due to undesirable noise.

It will be understood that construction of the described disclosure, and other components, is not limited to any specific material. Other exemplary aspects of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary aspects, is illustrative only. Although only a few aspects of the present innovations have been described in detail in this disclosure, those skilled in the art who review this disclosure will readily appreciate that many modifications are possible (e.g., variations in sizes, dimensions, structures, shapes, and proportions of the various elements values of parameters, mounting arrangements, use of materials, color, orientations, etc.) without materially departing from the novel teachings and advantages of the subject matter recited. For example, elements shown as integrally formed, the operation of the interfaces may be reversed or otherwise varied, the length or width of the structures and/or members or connector to other elements of the system may be varied, and the nature or numeral of adjustment positions provided between the element may be varied. It should be noted that the elements, and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary aspects without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims as set forth below, are incorporated into and constitute part of this Detailed Description.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seat cushion assembly comprising:
a first foam pad defining a ventilating column disposed therethrough;
a topper pad disposed over the first foam pad;
a second foam pad disposed adjacent the first foam pad, the second foam pad and the first foam pad defining a flow channel in fluid communication with the ventilating column;
a thermally conductive tape including a thermoelectric device disposed between the first foam pad and the topper pad, wherein the thermoelectric device is disposed near an end of the ventilating column; and
an air mover moving air from an air intake of the flow channel to an air exhaust of the flow channel, wherein the flow channel extends beneath the thermally conductive tape to deliver air to the ventilating column and the bottom of the thermoelectric device to cool or heat the thermoelectric device.

2. The vehicle seat cushion assembly of claim 1, wherein the thermally conductive tape further comprises:
a carrier; and
a support ring for retaining the thermoelectric device to the carrier.

3. The vehicle seat cushion assembly of claim 2, wherein the support ring fits into a recessed periphery disposed about the ventilating column.

4. The vehicle seat cushion assembly of claim 3, wherein a first surface of the support ring is substantially level with a first surface of the first foam pad.

5. The vehicle seat cushion assembly of claim 4, further comprising:
an interference fit between the support ring and the recessed periphery.

6. The vehicle seat cushion assembly of claim 5, further comprising:
an aperture in the topper pad and adjacent the thermoelectric device.

7. The vehicle seat cushion assembly of claim 6, further comprising:
a trim cover disposed over the topper pad.

8. The vehicle seat cushion assembly of claim 7, wherein the air travels along a second surface of the thermoelectric device.

9. The vehicle seat cushion assembly of claim 8, wherein the carrier retains a first thermoelectric device and a second thermoelectric device and wherein the carrier comprises a notched portion between the first thermoelectric device and the second thermoelectric device.

10. The vehicle seat cushion assembly of claim 1, wherein the thermoelectric device is selectively activable to heat or cool a surface of the seat cushion in response to a temperature input from a sensor.

11. The vehicle seat cushion assembly of claim 10, wherein the sensor comprises an infrared sensor mounted on an interior trim piece and wherein the temperature input comprises a facial temperature.

12. A seating assembly comprising:
a seat, wherein the seat comprises:
first and second foam pads;
a gallery disposed between the first and second foam pads and defined by a first gallery portion in the first foam pad and a second gallery portion in the second foam pad;
a ventilating column disposed through the first and second foam pads;
a thermoelectric device disposed in a housing in a recess in the ventilating column; and
an air mover moving air through the gallery, along a second surface of the thermoelectric device, and out of the ventilating column.

13. The seating assembly of claim 12, wherein the thermoelectric device disposed in a housing comprises a plurality of thermoelectric devices disposed in housings arranged along a flexible strip, wherein the ventilating column comprises a plurality of ventilating columns, and wherein the gallery comprises a plurality of galleries that deliver air to the plurality of ventilating columns.

14. The seating assembly of claim 12, wherein the first foam pad and the second foam pad are mechanically locked.

15. The seating assembly of claim 14, wherein a substantially airtight seal forms around the gallery when a force is disposed on the seat.

16. The seating assembly of claim 12, wherein a first portion of the gallery is molded into the first foam pad and a second portion of the gallery is molded into the second foam pad.

17. The seating assembly of claim 12, further comprising:
   a seatback, wherein the seatback comprises:
      a first foam pad and a second foam pad, wherein a gallery is disposed between the first foam pad and the second foam pad, wherein a ventilating column is disposed through the first foam pad and the second foam pad, wherein the gallery delivers air to the ventilating column, and wherein a thermoelectric device in a housing is press fit into a recess in the ventilating column; and
      an air mover moving air through the gallery, along a second surface of the thermoelectric device, and out of the ventilating column.

18. A method of making a cushion assembly, the method comprising:
   forming a first foam pad;
   forming a plurality of unobstructed ventilating air columns through the first foam pad;
   forming a second foam pad;
   forming the plurality of unobstructed ventilating air columns through the second foam pad;
   operably coupling the second foam pad with the first foam pad to define flow channels between the first foam pad and the second foam pad, the flow channels being in fluid communication with the unobstructed ventilating air columns;
   placing thermoelectric devices proximate a first surface of the first foam pad and at least a portion of the plurality of unobstructed ventilating air columns; and
   coupling an air mover to the flow channels to move air to the thermoelectric devices.

19. The method of making a cushion assembly of claim 18, further comprising the step of:
   disposing the thermoelectric devices in housing portions of a carrier strip.

20. The method of making a cushion assembly of claim 19, further comprising the step of:
   placing the housing portions into recesses in the ventilating air columns.

* * * * *